United States Patent
Chen

(10) Patent No.: US 11,199,814 B2
(45) Date of Patent: Dec. 14, 2021

(54) GASKET FOR SMARTWATCH COVER

(71) Applicant: Prime Art & Jewel, Dallas, TX (US)

(72) Inventor: Dillon Chen, Dallas, TX (US)

(73) Assignee: PRIME ART & JEWEL, Dallas, TX (US)

( * ) Notice: Subject to any disclaimer, the term of this patent is extended or adjusted under 35 U.S.C. 154(b) by 0 days.

(21) Appl. No.: 16/428,621

(22) Filed: May 31, 2019

(65) Prior Publication Data

US 2019/0368608 A1 Dec. 5, 2019

Related U.S. Application Data

(60) Provisional application No. 62/679,109, filed on Jun. 1, 2018.

(51) Int. Cl.
| | | |
|---|---|---|
| *F16J 15/02* | (2006.01) | |
| *G04B 37/00* | (2006.01) | |
| *G04B 37/22* | (2006.01) | |
| *G04G 17/08* | (2006.01) | |

(52) U.S. Cl.
CPC .......... *G04B 37/005* (2013.01); *F16J 15/022* (2013.01); *G04B 37/22* (2013.01); *G04G 17/08* (2013.01)

(58) Field of Classification Search
CPC .. F16J 15/022; F16J 15/00; F16J 15/46; F16J 15/48; F16J 15/08; F16J 15/024; F16J 15/025; F16J 15/20; F16J 15/3204; F16J 15/3232; F16J 15/3236; G04B 37/005; G04B 37/00; G04B 37/02; G04B 37/084; G04B 45/0069; G04B 47/04; G04G 17/00; G04G 17/08; G04G 17/083; G04G 17/086

USPC .......................................................... 277/312
See application file for complete search history.

(56) References Cited

U.S. PATENT DOCUMENTS

| | | | | |
|---|---|---|---|---|
| 2,841,429 | A  * | 7/1958 | Mccuistion | .......... F16J 15/3236 |
| | | | | 277/402 |
| 2,871,654 | A  * | 2/1959 | Fachon | .................. G04B 39/02 |
| | | | | 368/291 |
| 9,417,661 | B2 * | 8/2016 | McClure | ............. H04M 1/0277 |
| 2011/0013490 | A1* | 1/2011 | Li | ........................... G04G 21/00 |
| | | | | 368/10 |
| 2012/0126489 | A1* | 5/2012 | Picatto | ................. F16J 15/3232 |
| | | | | 277/562 |
| 2012/0155230 | A1* | 6/2012 | Patt | ........................ G04B 37/02 |
| | | | | 368/291 |
| 2019/0369563 | A1* | 12/2019 | Chen | ..................... G04G 17/08 |

FOREIGN PATENT DOCUMENTS

FR          2360926 A  *  4/1978  ............. G04B 39/02

\* cited by examiner

*Primary Examiner* — Nathan Cumar
(74) *Attorney, Agent, or Firm* — Ostrolenk Faber LLP

(57) ABSTRACT

In various implementations, a cover for a smartwatch is provided that includes a housing and a flexible member (e.g., a gasket). The cover may increase user satisfaction with the smartwatch by increasing the aesthetics of the watch for the user, providing flexibility in appearance, and/or inhibiting damage to the watch itself. The gasket may secure the smartwatch in the cover, inhibit damage to the outer housing of the cover by an inner surface of the cover, and/or inhibit interference from the cover with operations of the smartwatch.

20 Claims, 16 Drawing Sheets

GASKET FOR SMARTWATCH COVER

CROSS-REFERENCE TO RELATED APPLICATIONS

This application claims the benefit of U.S. Provisional Patent Application No. 62/679,109 entitled "Smartwatch Case" and filed on Jun. 1, 2018, which is incorporated by reference herein for all purposes.

TECHNICAL FIELD

The present invention relates to gaskets for smartwatch covers.

BACKGROUND

Commonly, watches vary with respect to appearance, mechanics, and price point. Mechanical watches include movements that control the functionality of the watch (e.g., time and/or date tracking), while smartwatches often include computers to control the functionality of the watch. Additionally, while mechanical watches vary widely in appearance, the variation in the appearances of smartwatches is much narrower. While watches (mechanical and smartwatches) are used to provide a function, such as telling time or with respect to smartwatches allowing communication (calls, texts, etc.) and/or retrieval of information (e.g., weather, email, website data, etc.), watches also serve as a fashion accessory.

SUMMARY

In various implementations, a cover for a smartwatch is provided that includes a housing and a flexible member. The cover may increase user satisfaction with the smartwatch by increasing the aesthetics of the watch for the user, providing flexibility in appearance, and/or inhibiting damage to the watch itself. The cover may not substantially interfere with the functionality of the smart watch. For example, the cover may allow access to presentation interfaces and/or input components (e.g., buttons and/or touchscreen).

In various implementations, a smartwatch cover may receive a smartwatch without substantially inhibiting operations of the watch (e.g., access to touch screen, buttons, transmission of signals, receipt of signals, etc.). The smartwatch cover may include a housing and a flexible member couplable to an inner surface of the housing. The housing may receive at least a portion of a case of a smartwatch. The housing may have an inner surface and an opposing outer surface. The housing may include an opening through which a top surface of a smartwatch (e.g., touch screen, face, etc.) is accessible. A first plane may be defined relative to the housing and/or the cover. The first plane may be parallel to the top surface of the smartwatch when the smartwatch is disposed in the housing and/or to the top surface of the housing (e.g., the top surface may reside on the side of the housing that is oppose to the side of the housing that contacts a user during wear). The cover may include a flexible member coupleable to at least a part of the inner surface of the housing. The flexible member may include an annular strip with an opening disposed through the annular strip. The annular strip may include a first side coupled to the inner surface of the housing, and a second opposing side. The second side of the annular strip may contact a portion of a case of a smartwatch proximate the top surface of the smartwatch when the smartwatch is disposed in the cover.

The second side of the annular strip may be disposed at a first angle relative to the first plane (e.g., of the housing). This first angle may be approximately 20 to approximately 60 degrees relative to the first plane, in some implementations. The flexible member may include at least four legs extending away from the opening of the annular strip. The leg(s) may extend from the annular strip at a second angle relative to the first plane (e.g., of the housing). The second angle may be approximately 60 degrees to approximately 110 degrees. The flexible member may inhibit contact of the case of the smartwatch with the housing and/or may inhibit substantial degradation of signal transmission from the smartwatch when the smartwatch case is disposed at least partially in the cover. Implementations may include one or more of the following features. The flexible member may be coupled to the housing (e.g., via adhesive, bonding, etc.). The annular strip may have an approximately rectangular or an approximately oval shape. The shape of the opening of the housing and the shape of the opening of the flexible member may be similar. A shape of the opening of the housing and/or a shape of the opening of the flexible member may be approximately rectangular, in some implementations. A shape of the opening of the housing and/or or a shape of the opening of the flexible member may be approximately oval. One or more of the legs may be disposed at the second angle of approximately 80 degrees to approximately 100 degrees relative to the first plane of the housing. The inner surface of the housing may include a retaining member, and wherein the retaining comprises at least one of one or more recesses or one or more protrusions, wherein the retaining member is configured to strengthen the coupling between the flexible member and the housing. The housing may include a first end proximate the annular strip of the flexible member and a second opposing end. Leg(s) (e.g., a free end of the leg) may not extend to the second opposing end of the housing, in some implementations. The annular strip may include a first width and one or more narrowing portions with a second width, wherein the second width may be less than the first width. Narrowing portion(s) may allow access to portions of a smartwatch disposed in the smartwatch cover (e.g., buttons). The flexible member may inhibit substantial degradation of signals (e.g., due to contact between a metal portion of a housing and the case of the smartwatch) received by the smartwatch when the smartwatch case is disposed at least partially in the cover.

In various implementations, a flexible member (e.g., a gasket) may be provided that is couplable to a housing of a smartwatch cover. The flexible member may include a first plane approximately parallel with a top surface of a smartwatch disposed in a smartwatch cover. The flexible member may be couplable to at least a part of an inner surface of a housing of the smartwatch cover. The flexible member may include an annular strip and an opening disposed through the annular strip. The annular strip may include a first side coupled to the inner surface of the housing and a second opposing side. The second side of the annular strip may contact a portion of the case of the smartwatch proximate the top surface of the smartwatch, when the smartwatch is disposed in the smartwatch cover. The second side of the annular strip may be disposed at a first angle relative to the first plane. The first angle of the second side may be approximately 20 to approximately 60 degrees relative to the first plane. The flexible member may include at least four legs extending away from the opening of the annular strip. The leg(s) may extend from the annular strip at a second angle relative to the first plane. The second angle may be approximately 60 degrees to approximately 110 degrees.

The flexible member may inhibit contact of the smartwatch case with the housing while the smartwatch is disposed in the cover. The flexible member may inhibit substantial degradation of signal transmission from the smartwatch when the smartwatch case is disposed at least partially in the cover.

Implementations may include one more of the following features. The flexible member may be a unibody flexible member. The annular strip may include segments. The flexible member may have an approximately uniform thickness. The flexible member may be silicone. At least a portion of one or more of the legs of the flexible member may taper as the one or more legs extend away from the annular strip (e.g., a leg may taper as along the length of the leg towards the free end of the leg). Leg(s) may be similar in shape and/or size, in some implementations. The first angle of the second side may be approximately 20 to approximately 60 degrees relative to the first plane (e.g., approximately 45 degrees). The leg(s) may be disposed at the second angle of approximately 80 degrees to approximately 100 degrees (e.g., approximately 90 degrees) relative to the first plane. The flexible member may inhibit substantial degradation of signals (e.g., due to contact between a metal portion of a housing and the case of the smartwatch) received by the smartwatch when the smartwatch case is disposed at least partially in the cover.

In various implementations, a smartwatch cover may include a housing and a flexible member coupled to the housing. The housing may receive at least a portion of a case of a smartwatch. The housing may include an inner surface and an opposing outer surface. An opening may be disposed through the housing through which a top surface of a smartwatch is accessible. A first plane of the housing may be defined relative to the smartwatch and/or case of the smartwatch. The first plane may be parallel to a top surface of the smartwatch (e.g., case) when the case of the smartwatch is disposed in the housing. The flexible member may be coupled to at least a part of the inner surface of the housing. The flexible member may include a first opening and a strip at least partially circumscribing a perimeter of a top portion of the inner surface of the housing and at least a portion of the first opening in the flexible member. The strip may include a first side coupled to the inner surface of the housing and a second opposing side. The second side of the strip may contact a portion of the case of the smartwatch proximate the top surface of the smartwatch when the case of the smartwatch is disposed at least partially in the cover. The second side of the strip may be disposed at a first angle relative to the first plane of the housing. The first angle may be approximately 20 to approximately 60 degrees relative to the first plane. The flexible member may include at least two legs extending away from the opening of the strip of the flexible member. The leg(s) may extend from the strip of the flexible member at a second angle relative to the first plane of the housing. The second angle may be approximately 60 degrees to approximately 110 degrees. The flexible member may inhibit contact of the smartwatch case with the housing of the smartwatch cover. The flexible member may inhibit substantial degradation of signal transmission from the smartwatch when the case of the smartwatch is disposed at least partially in the cover.

Implementations may include one or more of the following features. The strip may include two or more segments. The ends of the segment(s) of the strip may be separated by one or more gaps. The flexible member may be a unibody flexible member. The first angle of the second side may be approximately 20 to approximately 60 degrees relative to the first plane (e.g., approximately 45 degrees). The leg(s) may be disposed at the second angle of approximately 80 degrees to approximately 100 degrees (e.g., approximately 90 degrees) relative to the first plane. The flexible member may inhibit substantial degradation of signals (e.g., due to contact between a metal portion of a housing and the case of the smartwatch) received by the smartwatch when the smartwatch case is disposed at least partially in the cover.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

Figure 1A:
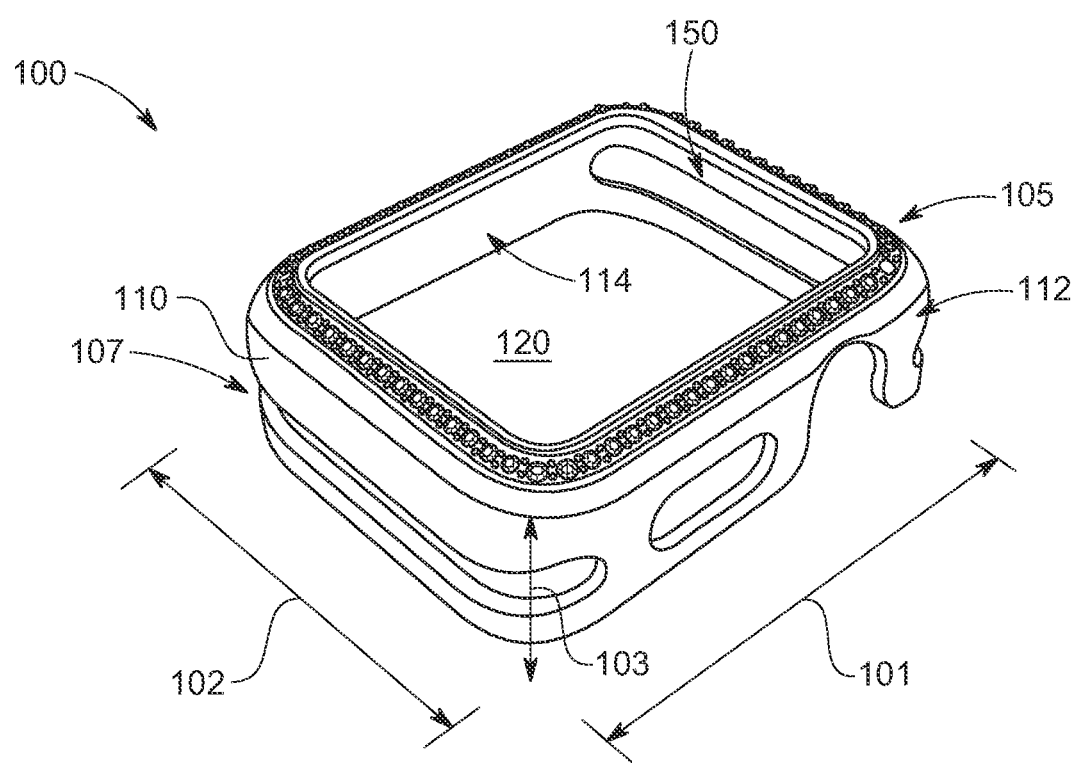
FIG. 1A illustrates a top perspective view of an implementation of an example cover for a smartwatch.

Smartwatches have been gaining in popularity as a replacement for and/or supplement to wristwatch collections for individuals. However, unlike traditional mechanical watches, smartwatches tend to be similar in appearance. For example, while mechanical watches may have innumerable different designs with differing colors, dials, hands, bezels, bands, lugs, etc., there are several order of magnitudes fewer options for smart watches. As an example, some smartwatch companies offer watches with 6 case color options with a single dial shape. Thus, users find themselves limited in terms of the customization of the smartwatches directly with the manufacturer and find themselves with watches that are identical to others. This loss of distinctiveness with smartwatches may negatively impact the value of the watch to the user and/or in the marketplace.

Smart watches, unlike most traditional mechanical watches, may include computer based functionality such as the ability to receive and/or transmit communications (e.g., text, mail, voice calls, video calls, etc.), information (e.g., weather, time, date, news, alerts, calendar appointments, etc.), etc. Sensors and/or communication components may be sensitive to interference caused by contact with metal. For example, contact between the case of the smart watch and metal surfaces (e.g., of a cover) may interfere with wireless transmission of signals and/or receipt of signals, such as Bluetooth, WiFi, cellular data (e.g., LTE), etc. Thus, user satisfaction with a smartwatch may increase if a metallic or partially metallic cover, as described, is available that does not have substantial interference issues (e.g., with communications).

Smartwatches also commonly include screen accessible functionality. For example, many smartwatches include touchscreens in replacement of and/or in addition to a crown and/or other side buttons (e.g., power button). Thus, the touch screen of the smartwatch may be either directly contactable and/or any protective cover (e.g., film, coating, etc.) may allow transmission of the contact with the cover to the touchscreen of the smartwatch. Damage to the touchscreen (e.g., scratches, cracks, chips, etc.), for example, may inhibit use of the smartwatch or feature(s) thereof. Thus, the described cover for a smartwatch may increase user satisfaction by increasing aesthetics, increase customization options, and/or inhibit damage while not substantially interfering with smartwatch functions (e.g., allowing communications, downloading and/or transmitting data, etc.).

In various implementations, a smartwatch may include a case and band(s) extending from the lugs of the case. Smartwatches are commercially available, for example, from computer hardware manufacturers such as Apple® and Samsung®; traditional watch manufacturers such as Fossil®, and/or others such as Google® and Fitbit®. The smartwatch case may house processors, memory, sensors, communication interfaces, etc. The smartwatch case may also include presentation and/or input interfaces such as touchscreens (e.g., crystal, display, capacitive touch panel) and/or buttons (e.g., power button, volume button, etc.).

In various implementations, the cover for the smartwatch may include a housing and a flexible member coupled to the housing. The cover may not substantially inhibit the operations and/or features of a smartwatch disposed in the cover. For example, a user may be able to provide input and/or be presented information via the touchscreen and/or button(s) of the smartwatch while the smartwatch case is disposed at least partially in the cover. As another nonlimiting example, the smartwatch disposed in a cover may be able to utilize communication protocol such as WiFi, mobile communication standards, Bluetooth, etc. without substantial interference due to the case (e.g., the loss of signal due to the smartwatch being disposed in the case may be less than approximately 15%). As another nonlimiting example, the operation of sensors in the smartwatch disposed in the described case may not be substantially inhibited when the smartwatch case is disposed at least partially in the cover.

Figure 1C:
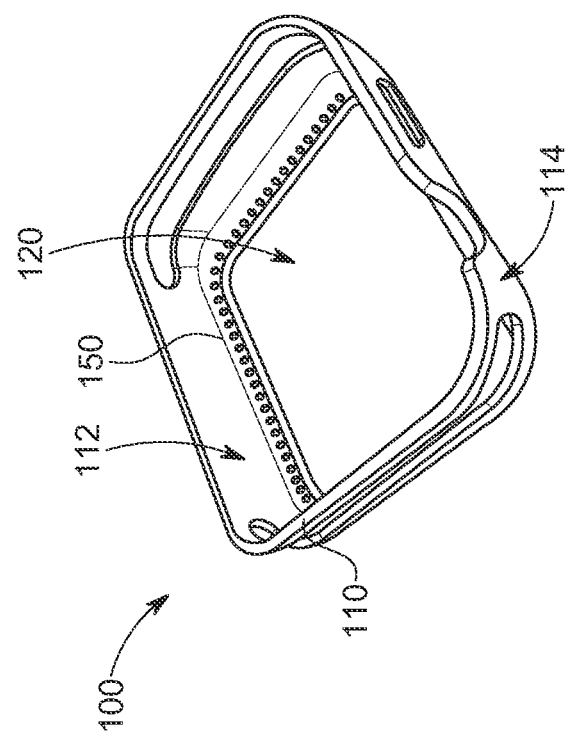
FIG. 1C illustrates a second side perspective view of an implementation of the example cover illustrated in FIG. 1A.
Figure 1B:
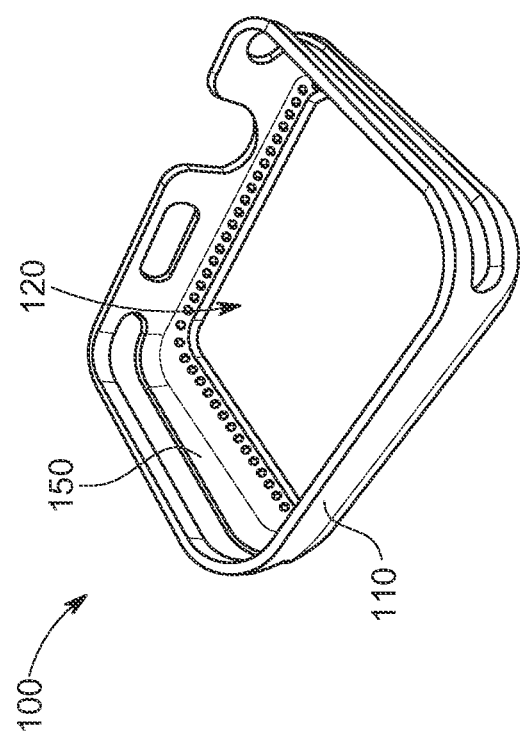
FIG. 1B illustrates a first side perspective view of an implementation of the example cover illustrated in FIG. 1A.
Figure 1D:
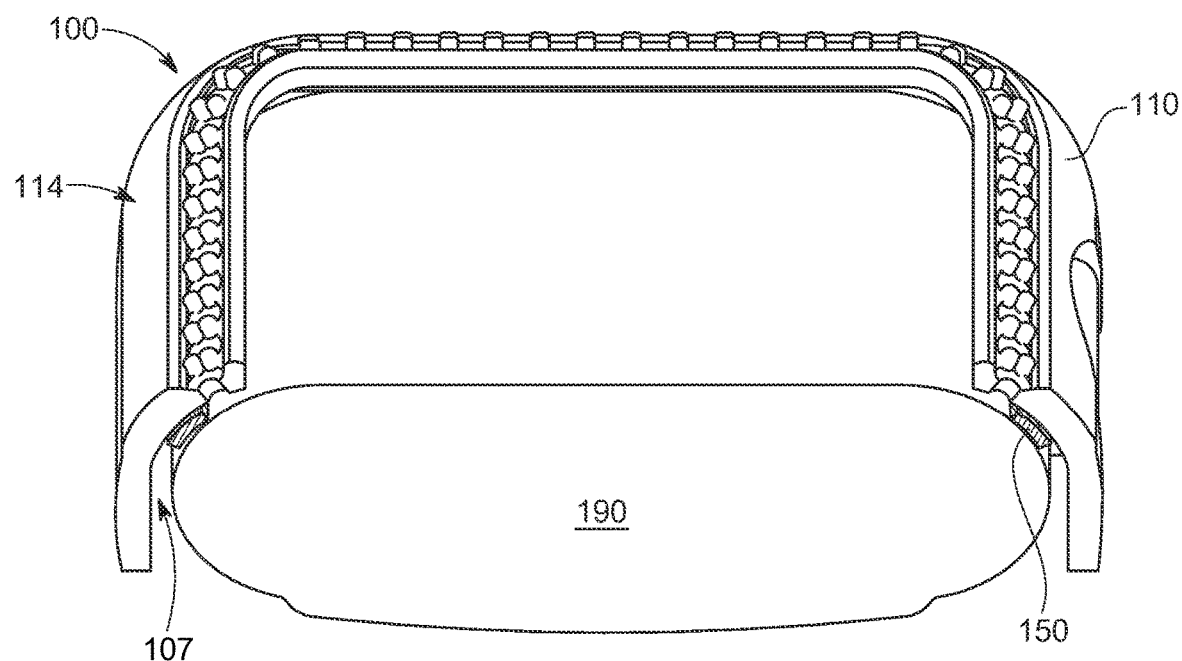
FIG. 1D illustrates a cross-sectional view of an implementation of the example cover, illustrated in FIG. 1A, with a watch disposed in the example cover.
Figure 1E:
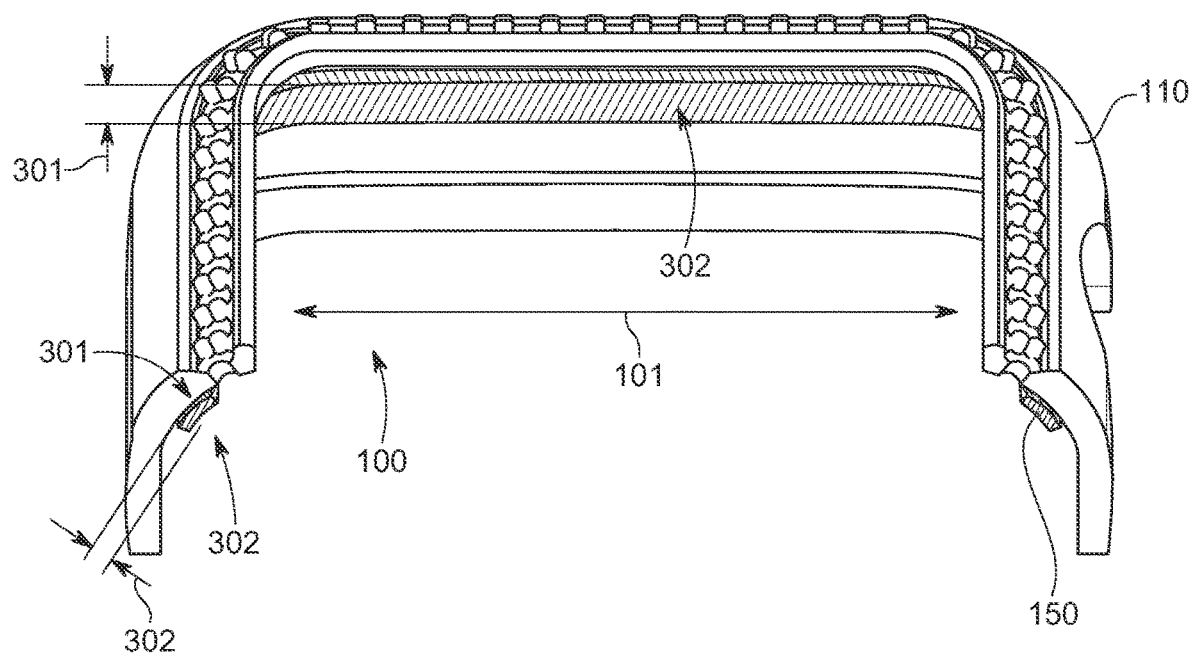
FIG. 1E illustrates the cross-sectional view of the implementation of the example cover, illustrated in FIG. 1D, without the watch disposed in the example cover.
Figure 1F:
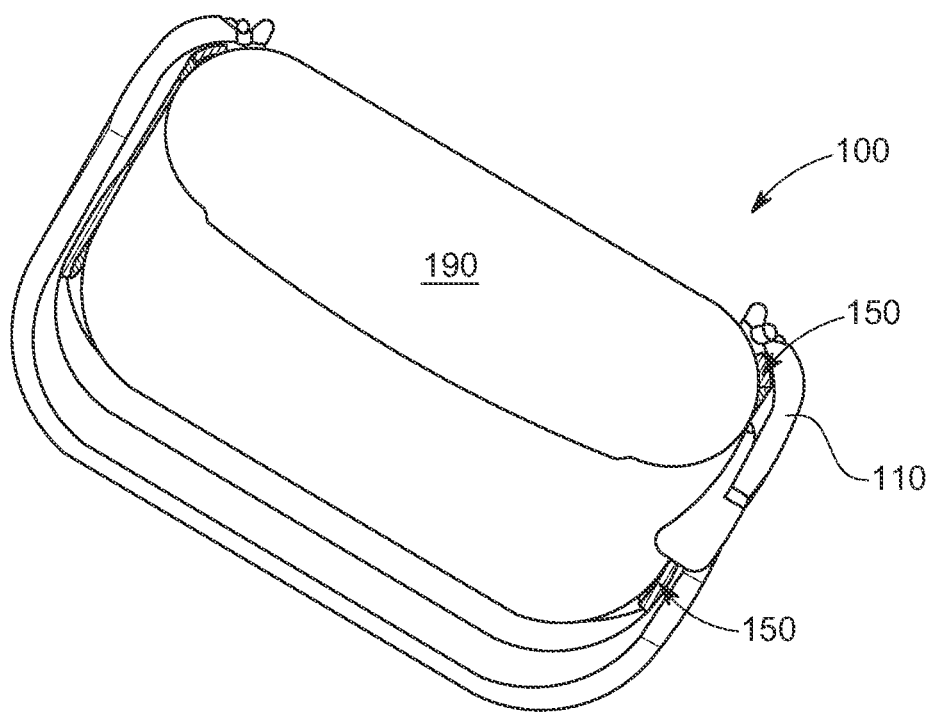
FIG. 1F illustrates a cross-sectional view of an implementation of the example cover, illustrated in FIG. 1A, with a watch disposed in the example cover.
Figure 1G:
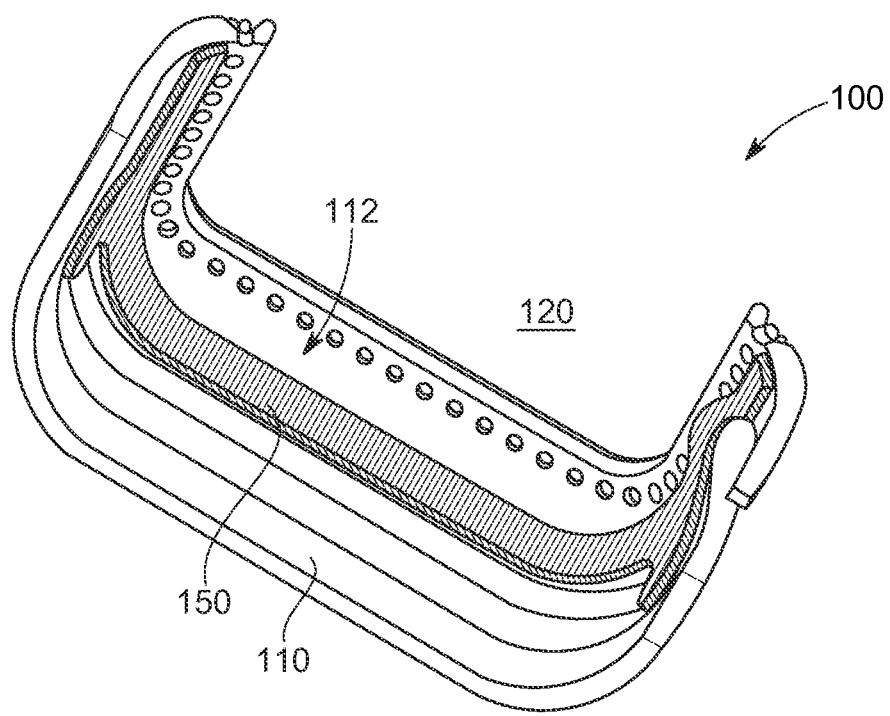
FIG. 1G illustrates the cross-sectional view of the implementation of the example cover, illustrated in FIG. 1F, without the watch disposed in the example cover.

FIGS. 1A-1G illustrate an example smartwatch cover from various perspectives. FIG. 1A illustrates a top perspective view of an implementation of an example cover for a smartwatch. FIG. 1B illustrates a side perspective view of the cover and FIG. 1C illustrates an opposing side perspective view. A first cross-sectional view of the example smartwatch cover is illustrated with a smartwatch disposed in the cover (FIG. 1D) and without a smartwatch disposed in the cover (FIG. 1E). A second cross-sectional view of the example smartwatch cover is illustrated with a smartwatch disposed in the cover (FIG. 1F) and without a smartwatch disposed in the cover (FIG. 1G). As illustrated, the cover 100 includes a housing 110 and a flexible member 150 coupled to the housing 110.

The housing 110 may have any appropriate size and/or shape. The housing may have a first side (e.g., proximate the screen and/or face of a coupled smartwatch) and an opposing second side (e.g., the side closer to the user's arm; the side that contacts the user's arm). The housing may be designed to receive the case of the smartwatch and/or portions thereof (e.g., top half, etc.). For example, the housing may allow a case of a smartwatch to be inserted from a second side of the housing and be received in the case. Features of the first side (e.g., a size of an opening proximate the first side; retaining members, etc.) may inhibit the case of the smartwatch from exiting the cover via the first side, in some implementations. In some implementations, the case of the smartwatch may be inserted into the cover via the first side and retained by features of the first side (e.g., retaining members). As another example, the housing may have hinge(s) and open to receive at least a portion of the case of the smartwatch and close to retain the case or portions thereof in the cover.

The housing 110 may have a larger size than a case of a smartwatch such that at least a portion of the case may be received in the housing 110. The housing may be sized, in some implementations, to be slightly larger than the case of the smartwatch such that the case is unobstructive while wearing, maintains a similar profile, etc. In some implementations, the housing may be significantly larger that the case to provide a specified aesthetic to the smartwatch cover.

The housing may have any appropriate shape and/or size. For example, the housing may be rectangular, circular, oval, and/or any other irregular or regular shape. The housing may or may not have a shape similar to at least a portion of the smartwatch case the housing is configured to receive. For example, a smartwatch case may have a rectangular face and the housing may have a rectangular cross-section in a plane of a first axis 101 and second axis 102, as illustrated in FIG. 1A. The shape of the cross-section may or may not vary along the third axis 103 (e.g., perpendicular to the first axis 101 and the second axis 102). As another nonlimiting example, the smartwatch case may have a rectangular face and the housing may have an oval cross-section in the plane of the first axis 101 and the second axis 103. Users desire unique timepieces and/or customization of timepieces and so using different styles of housings and/or different cross-sectional shaped housings may allow users to change the appearance of the smartwatch without buying a new smartwatch.

The housing 110 may include an inner surface 112, to which the flexible member 150 may be coupled, and an opposing outer surface 114. The inner surface 112 may include retaining member(s) (e.g., retaining member 216 illustrated in housing 200 of FIG. 2E) to increase coupling between the flexible member 150 and the housing 110 and/or to inhibit release of the coupling between the flexible member and the housing. The retaining member may include protrusions, recesses, textures, and/or combinations thereof. As illustrated in FIG. 2E, the retaining member may include protrusions in at least a portion of the inner surface of the housing to which the flexible member couples.

Figure 2A:
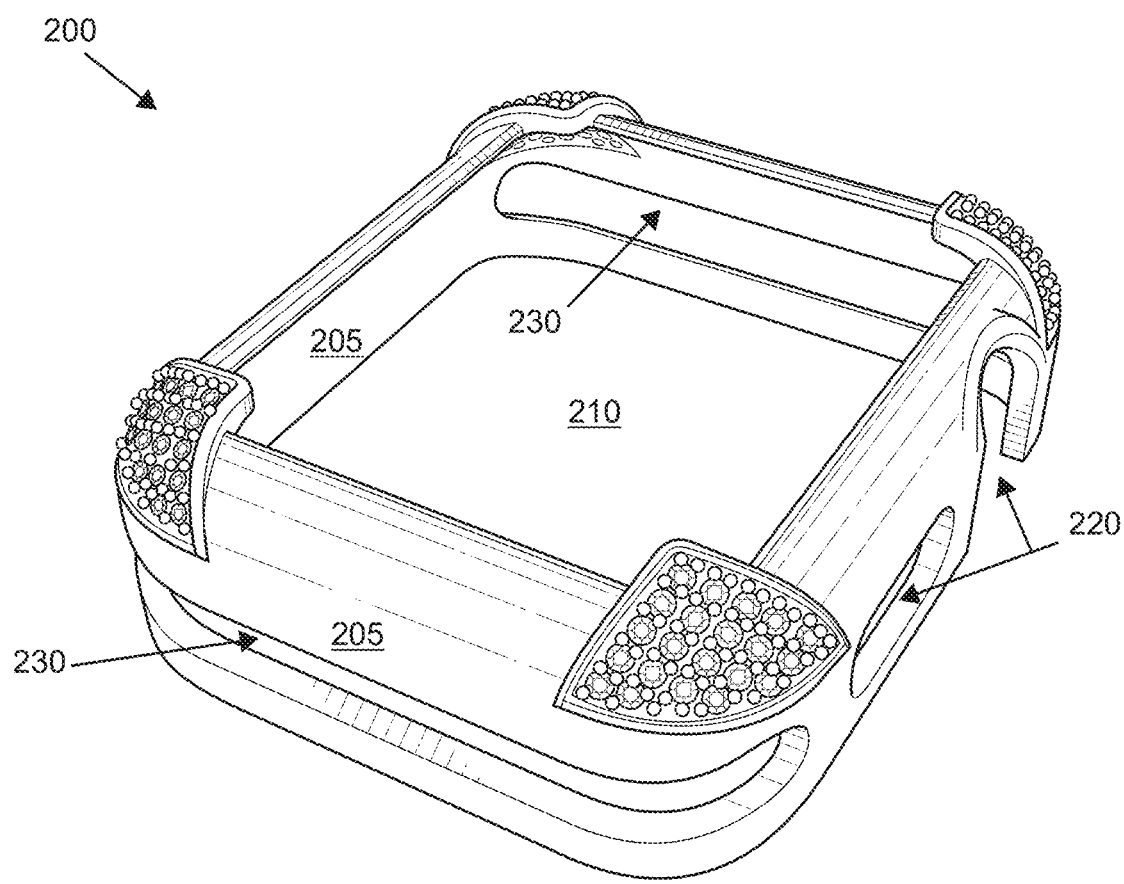
FIG. 2A illustrates an implementation of an example housing for a smartwatch cover.
Figure 2B:
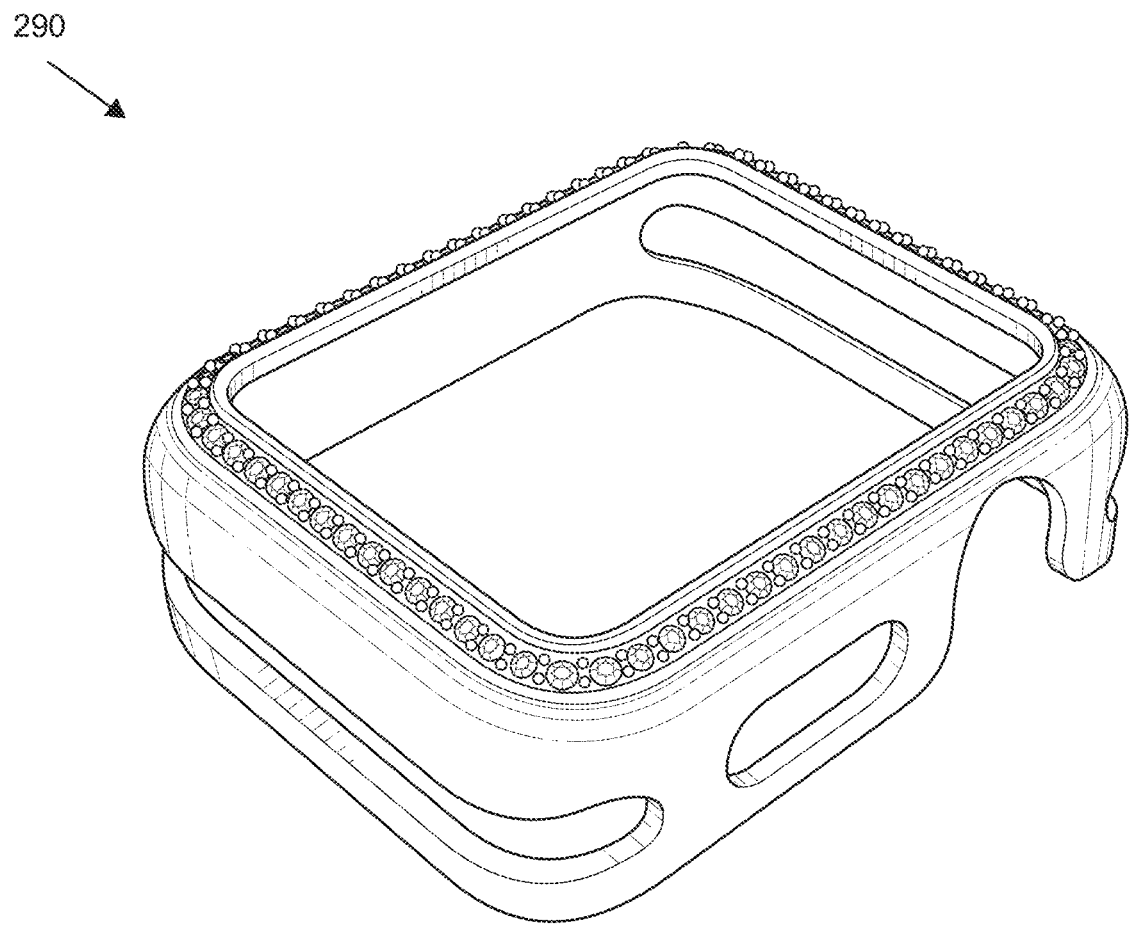
FIG. 2B illustrates an implementation of an example housing for a smartwatch cover.

The outer surface 114 may have aesthetic features such as beveled edges, stones (e.g., crystals, gems, glass, etc.), textures, finishes, coatings, etc., as illustrated in FIGS. 2A-2B. In various implementations, the outer surface may have any appropriate color, size, and/or shape. The outer surface may or may not have a similar shape to the inner surface 112 and/or a smartwatch case disposed in the cover. For example, a rectangular smartwatch case 190 may be disposed in a rectangular interior and rectangular exterior surface, as illustrated in FIGS. 1D and 1F. The inner surface 112 may have a similar size and/or shape to a smartwatch the case is configured to receive. For example, a cover 100 for a rectangular smartwatch 190 case may have a similarly rectangular inner surface 112, as illustrated in FIG. 1D. As another nonlimiting example, a cover for a circular smartwatch case may have a similar circular inner surface 112 and/or outer surface.

Figure 2C:
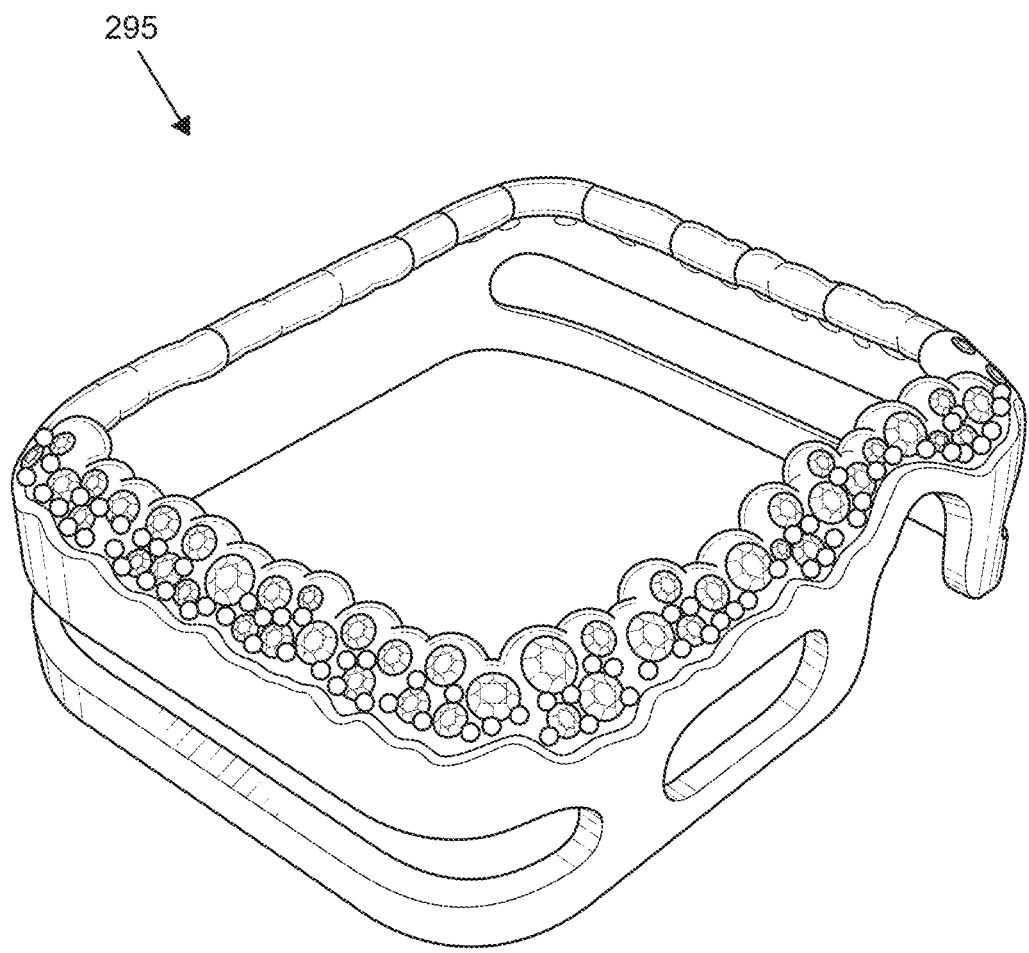
FIG. 2C illustrates an implementation of an example housing for a smartwatch cover.
Figure 2D:
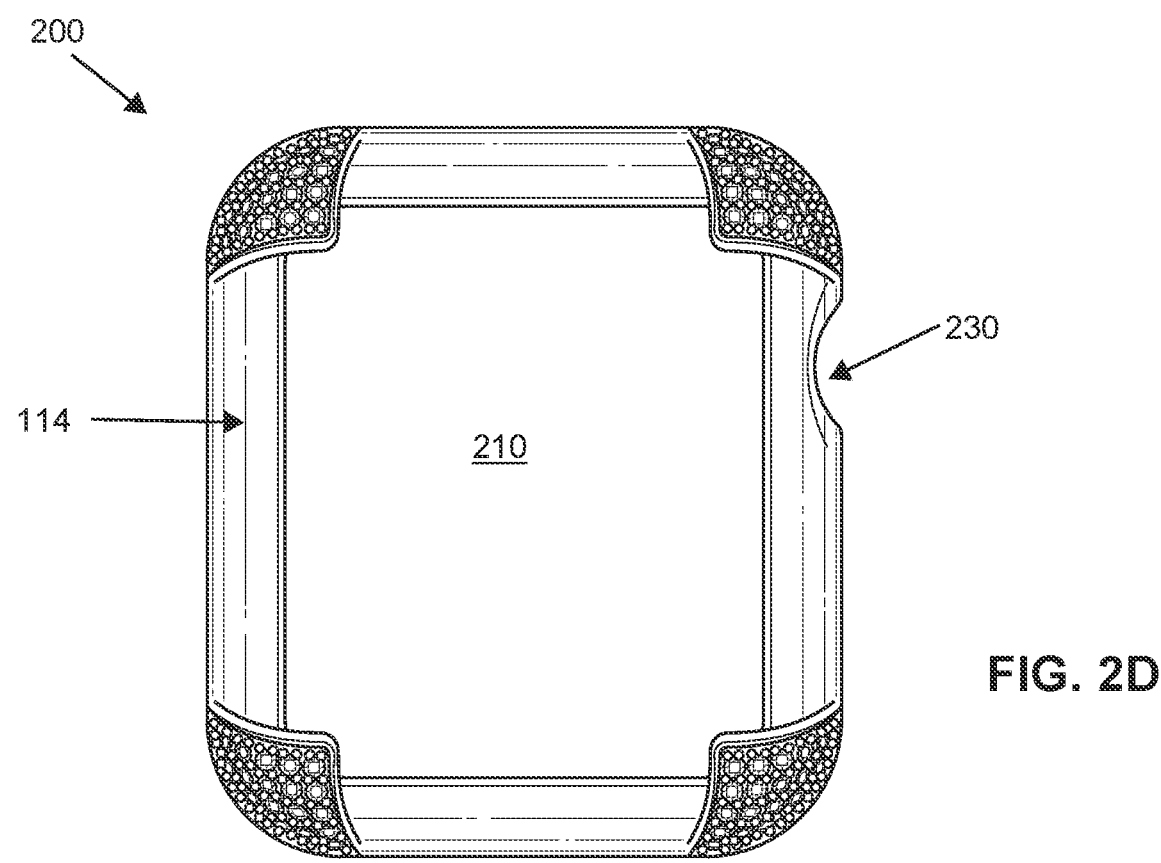
FIG. 2D illustrates a front view of an implementation of the example housing, illustrated in FIG. 2A.
Figure 2E:
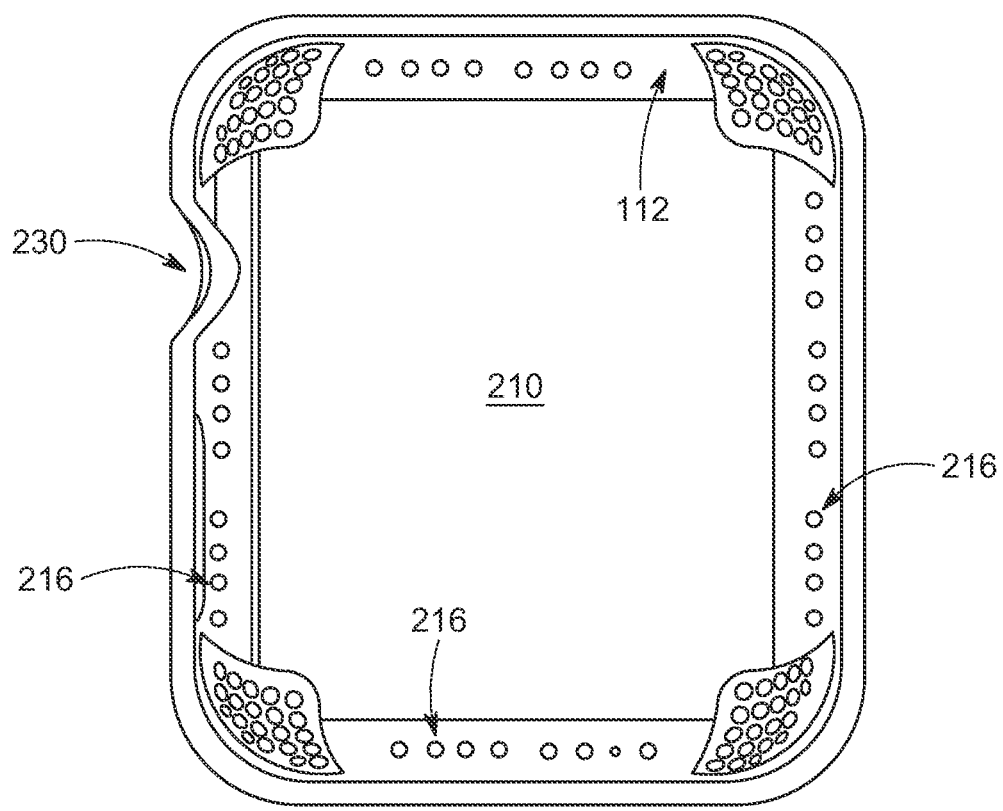
FIG. 2E illustrates a back view of an implementation of the example housing, illustrated in FIG. 2A.
Figure 2F:
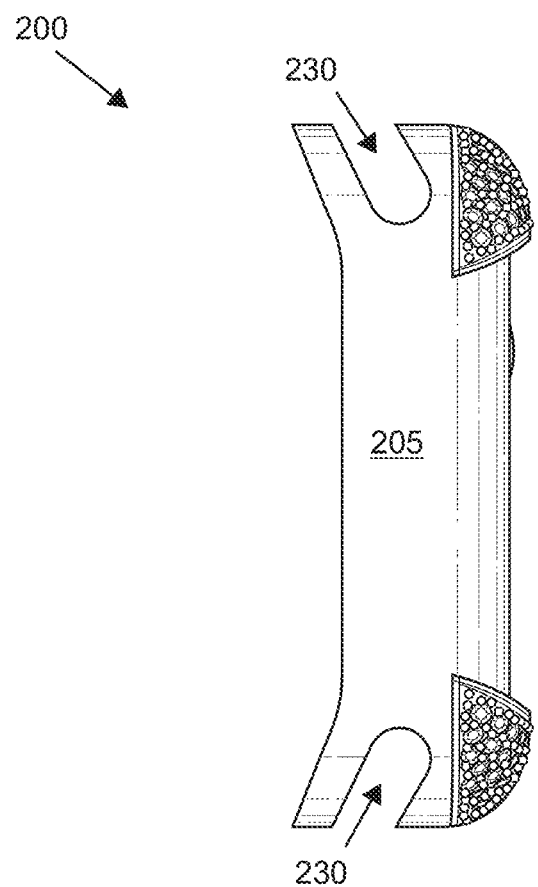
FIG. 2F illustrates a side view of an implementation of the example housing, illustrated in FIG. 2A.
Figure 2G:
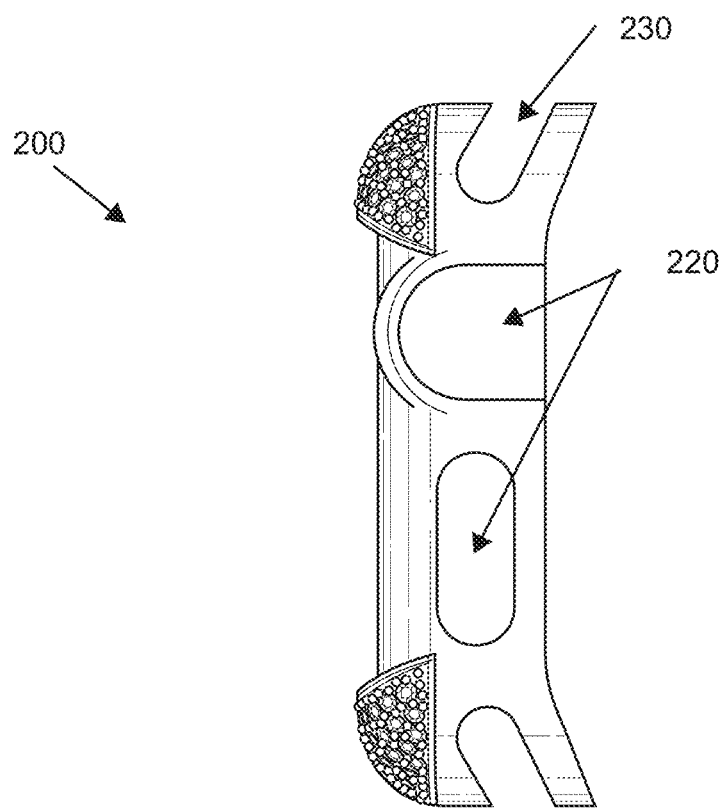
FIG. 2G illustrates another side view of an implementation of the example housing, illustrated in FIG. 2A.
Figure 2H:
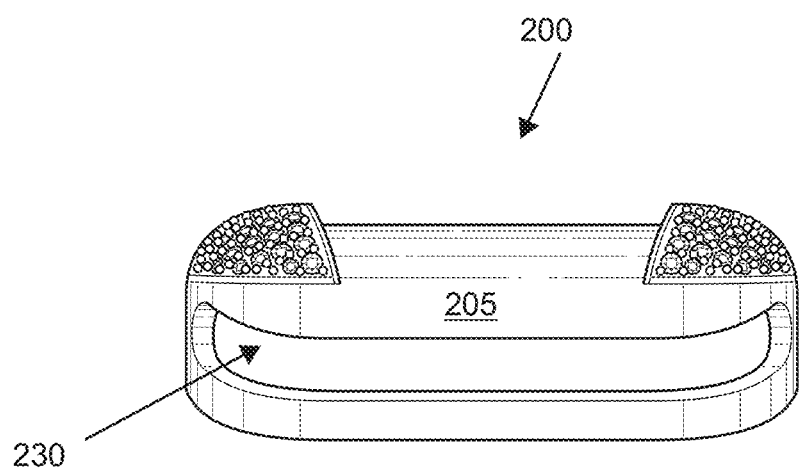
FIG. 2H illustrates another side view of an implementation of the example housing, illustrated in FIG. 2A.
Figure 3A:
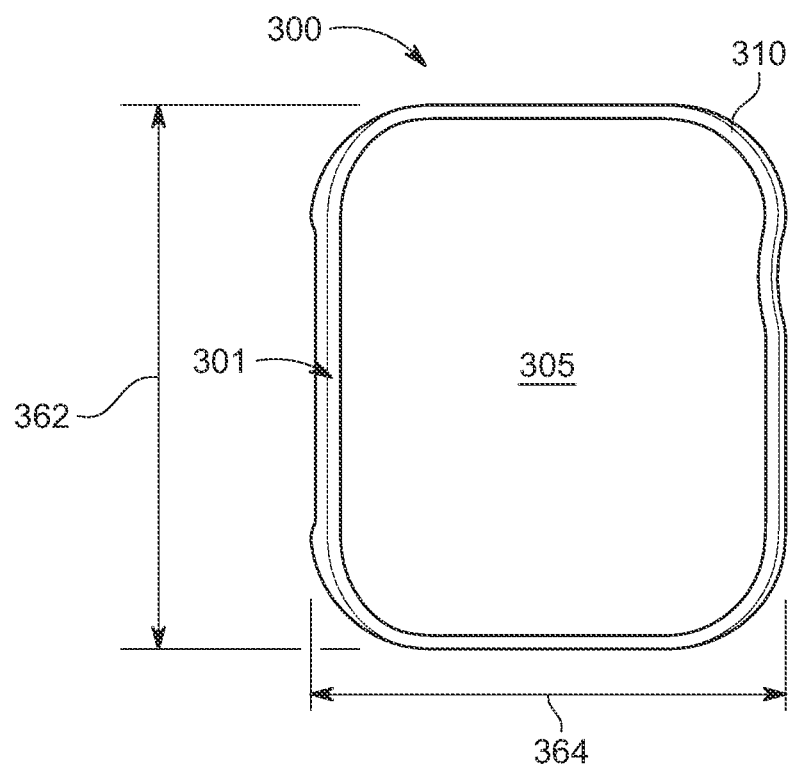
FIG. 3A illustrates a front view of an implementation of an example flexible member for a smartwatch cover.
Figure 3B:
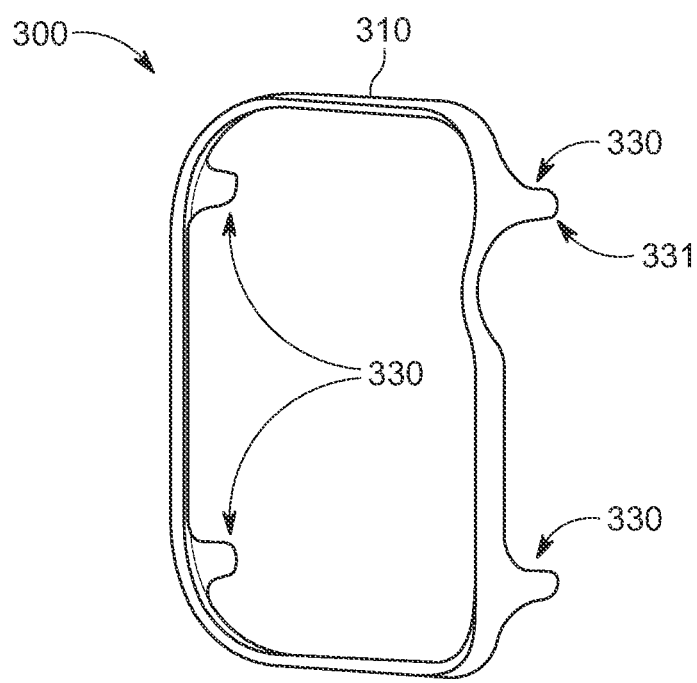
FIG. 3B illustrates a front perspective view of an implementation of the example flexible member, illustrated in FIG. 3A.
Figure 3C:
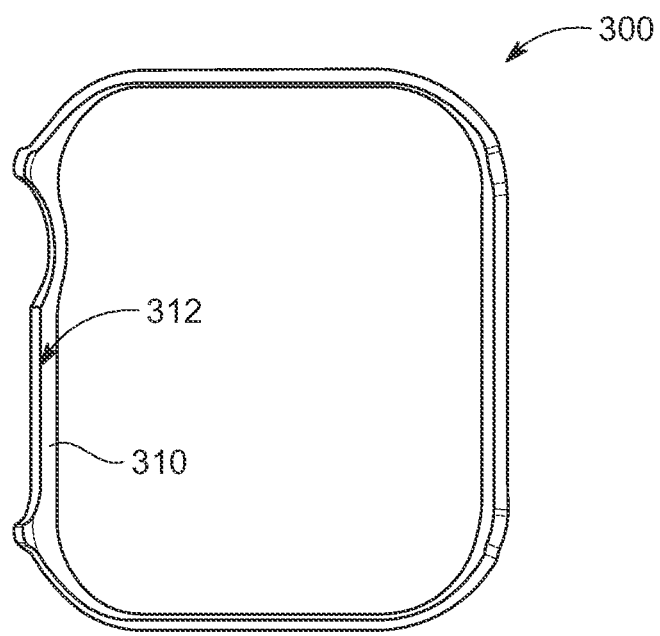
FIG. 3C illustrates a back view of an implementation of the example flexible member, illustrated in FIG. 3A.
Figure 3D:
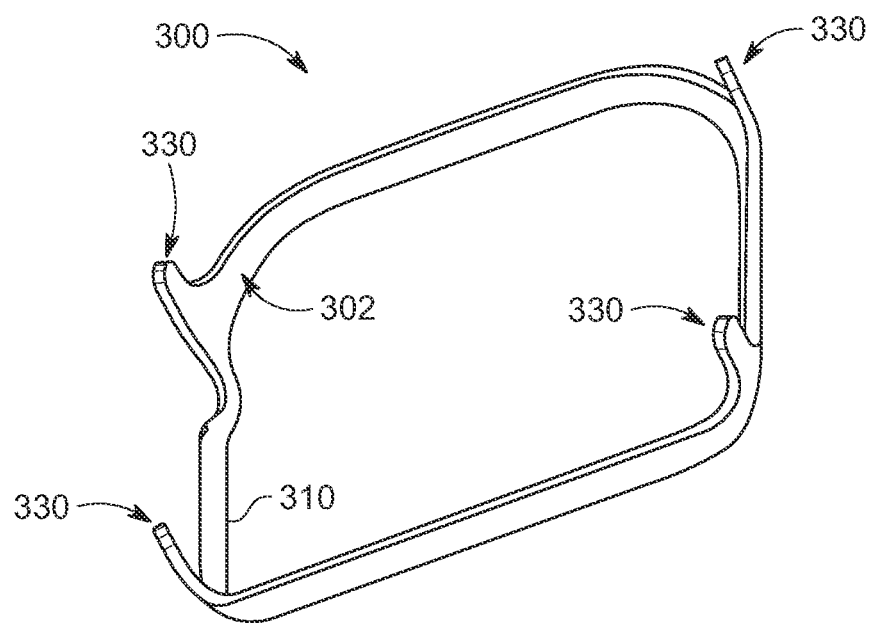
FIG. 3D illustrates a back perspective view of an implementation of the example flexible member, illustrated in FIG. 3A.
Figure 3E:
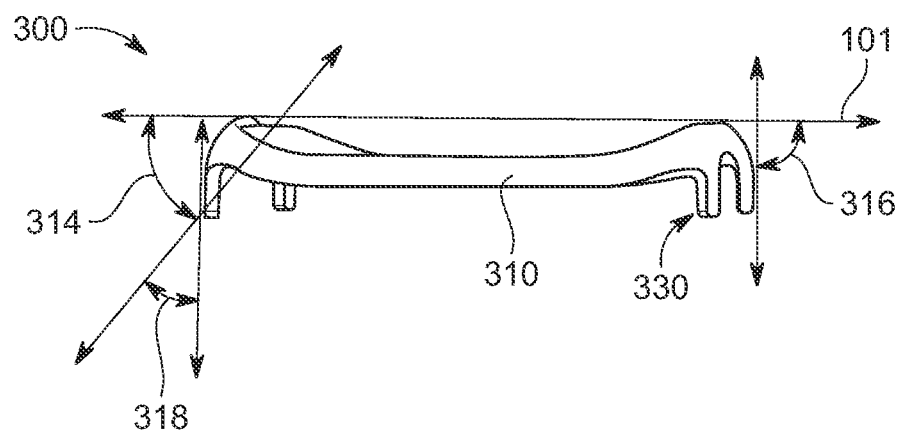
FIG. 3E illustrates a first side view of an implementation of the example flexible member, illustrated in FIG. 3A.
Figure 3F:
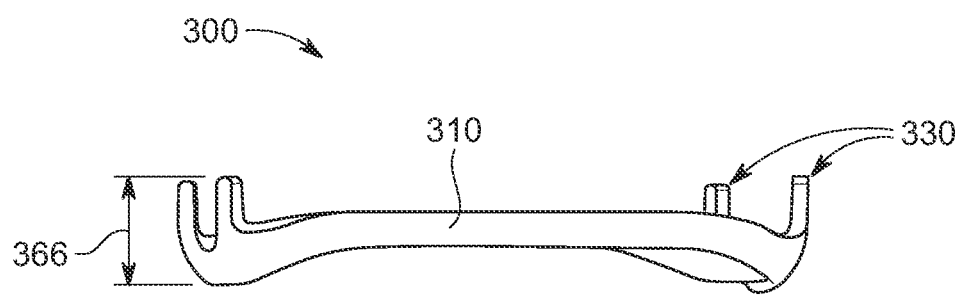
FIG. 3F illustrates a second perspective view of an implementation of the example flexible member, illustrated in FIG. 3A.
Figure 3G:
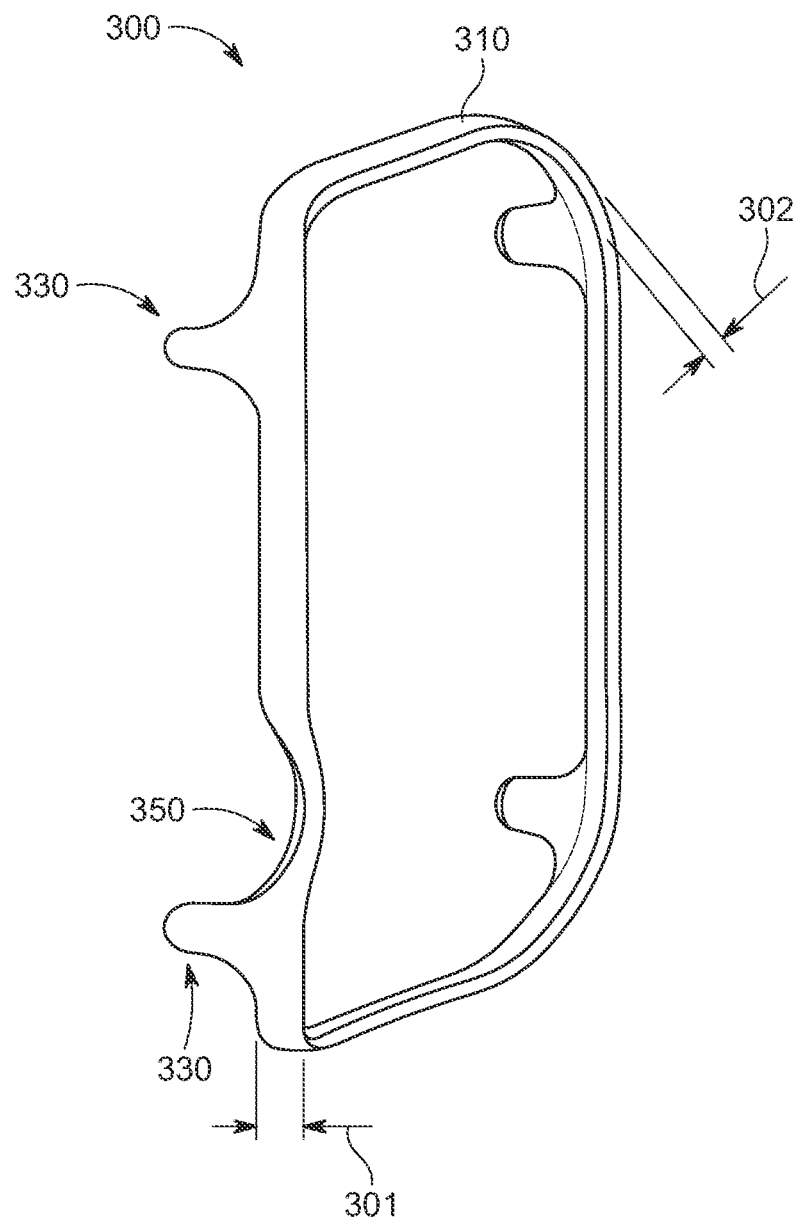
FIG. 3G illustrates a third side perspective view of an implementation of the example flexible member, illustrated in FIG. 3A.
Figure 3H:
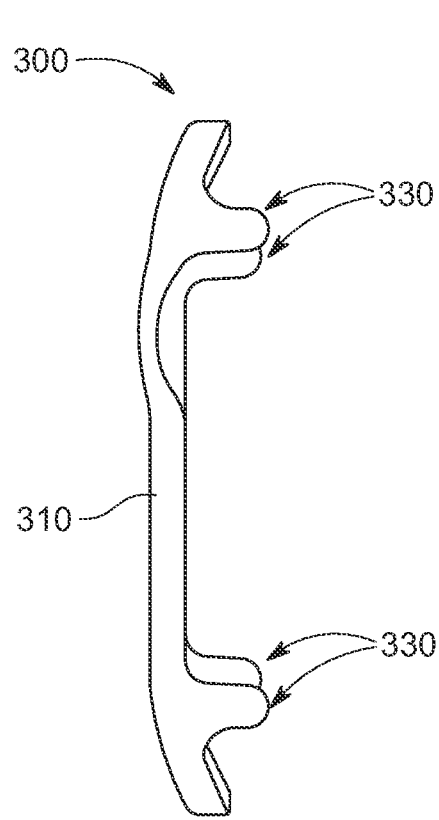
FIG. 3H illustrates the third side view of an implementation of the example flexible member, illustrated in FIG. 3A.
Figure 3I:
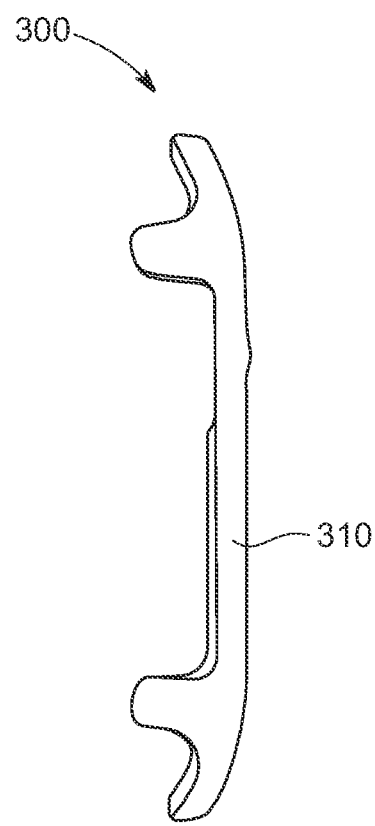
FIG. 3I illustrates a fourth side view of an implementation of the example flexible member, illustrated in FIG. 3A.

FIGS. 2A-C illustrates implementations of an example housings. The housings 200, 290, 295 may be utilized in a smartwatch cover, such as the smartwatch cover illustrated in FIG. 1A. In some implementations, the housings may include metal. Metal housings may increase user satisfaction with a smartwatch case for aesthetic, durability, variability, protection, etc. For example, high end timepieces commonly include metal cases, and utilizing a metal housing for the smartwatch cover may increase user satisfaction by giving the smartwatch the appearance of a high end timepiece while protecting the smartwatch case from damage and/or providing a customized appearance. As previously described, housings may be provided in a plurality of variations of outer surfaces to allow a user to customize their smartwatch appearance via the cover. As illustrated in FIG. 2A, the outer surface of housing 200 may include bevels, inlaid stones, raised decorative portions, etc. In some implementations, portions of the outer surface of housing may include stones inlaid in regular pattern(s), as illustrated in the housing 290 illustrated in FIG. 2B, and/or irregular pattern(s), as illustrated in housing 295 illustrated in FIG. 2C.

In some implementations, while some portions of outer surfaces (e.g., top surface proximate a face of a smartwatch) may vary, other portions (e.g., sides, inner surface, etc.) may be similar. As illustrated, an inner surfaces and/or features for the housing to receive a specified smartwatch may be similar while outer surfaces vary for a set of housings. FIGS. 2D-2G illustrate various views of the housing illustrated in FIG. 2A. As illustrated in FIGS. 2A, D-G, features of the housing configured to allow the smartwatch to be received by the housing may be similar to these features in FIGS. 2B-2C. The housing 200 may include a first opening 210 through the housing. The housing may include one or more button openings 220 disposed through one or more side walls of the housing. The button opening(s) may allow a user to access buttons (e.g., push buttons, sliding buttons, etc.) of a smartwatch, such as power buttons, volume buttons, etc., while the smartwatch is disposed in the housing. In some implementations, the case may include protrusions depress and/or otherwise activate corresponding button(s) on a specified smartwatch. The housing 200 may allow the bands of a smartwatch to pass through a sidewall of the housing. As illustrated in FIGS. 2A, 2D-G, the housing may include openings 230 that allow the bands to pass through the side walls 205 of the housing.

Although specific housings are illustrated other housing implementations may be utilized. For example, housings with different shapes, sizes, colors, coatings, materials and/or combinations thereof may be utilized in combination with the smartwatch case. A set of housings may be associated with and/or coupleable with a set of one or more brands of smartwatches. In some implementations, a set of housings may be associated with and/or couplable with a set of one or more sizes of smartwatches.

In various implementations, a flexible member (e.g., gasket) may be coupled to the housing of the smartwatch cover. While the flexible member may be flexible, the flexible member not be inelastically deformable under normal operating conditions, in some. By selecting a material for the flexible member that allows elastic deformation (e.g., as opposed to inelastic deformation) when the case of the smartwatch is disposed in the cover, the cover may be repetitively used (e.g., case inserted and/or removed repeatedly) with less concerns that the flexible member may allow contact between the case of the smartwatch and the housing (e.g., since the flexible member may not continue to inelastically deform and/or deform such that the case contacts the inner surface of the housing). For example, a flexible member may have a first width, and the width in a portion of the flexible member may decrease when the smartwatch is disposed in the cover, in some implementations. Once a smartwatch is removed from the cover, the flexible cover may return to approximately the first width.

The flexible member may inhibit movement of a smartwatch case in the housing. For example, the housing may be rigid and/or partially rigid. Thus, the housing may not exactly conform to the smartwatch case (e.g., due to tolerances, to inhibit contact between the housing or portions thereof and the case). The flexible member may at least partially fill the gap (see e.g., gap 107 in FIG. 1D) between the smartwatch case and the inner surface of the housing of the cover to inhibit movement of the smartwatch case. In some implementations, the flexible member may inhibit contact between the case of the smartwatch and at least a portion of the housing (e.g., a metallic portion). Since the case of the smartwatch includes components whose operations may be substantially inhibited by contact with another metallic surface, use of the flexible member to inhibit contact with metallic portions of the housing may increase user satisfaction (e.g., since the case may not substantially inhibit operation of the smartwatch when compared to a smartwatch used without a cover). In some implementations, inhibiting contact between the case of the smartwatch and the housing may inhibit damage to the case of the smartwatch (e.g., scratches, wear marks, etc.). Smartwatch cases may not be easily repaired (e.g., buffing may be difficult since sensitive electronics reside within the case) and/or replaced, and inhibiting damage to the outer surface of the case may increase the longevity of the smartwatch.

In some implementations, the shape of the flexible member may be selected such to inhibit inadvertent release of the smartwatch case from the cover and/or to inhibit contact between inner surfaces of the housing and the case of the smartwatch. In some implementations, at least a portion of the flexible member 150 may have a shape similar to a shape of at least a portion of the inner surface 112 of the housing 110, as illustrated in FIG. 1A-G. FIGS. 3A-3I illustrate various views of an implementation of a flexible member 300. The flexible member 300 may be utilized in a smartwatch cover, such as the smartwatch cover illustrated in FIG. 1A.

As illustrated, the smartwatch cover comprises a strip 310 and leg(s) 330. The strip 310 may have a width 301 and a thickness 302 (illustrated in FIGS. 1E and 3G). The flexible member 300 may include an opening 305 and the strip 310 may be disposed about the opening. The strip may have a shape similar to the opening (e.g., opening 120 illustrated in FIGS. 1A-C, 1G; opening 210 in FIG. 2A), in the housing, in some implementations. For example, the strip of the flexible member may be an annular member. The annular member may be rectangular, oval, other regular shapes, and/or other irregular shapes. The annular member may have a shape similar to a perimeter of a case of a smartwatch, in some implementations.

The flexible member may include segments (not shown). Gap(s) may reside between ends of two or more of the segments of the strip. For example, strip segments may be disposed about a perimeter of the opening 305 of the flexible member. A gap may or may not reside between the ends of a first strip segment and an end of the adjacent strip segment.

The strip 310 may include a first side 311 (e.g., a first surface may reside on first side) and an opposing second side 312 (e.g., on the second surface may reside on the second side). The first side 311 may contact and/or couple with the housing. The first side may or may not include coupling portions configured to be received by and/or receive retaining members (e.g., retaining members 216 illustrated in FIG. 2E) of the inner surface of the housing. For example, the housing may include protrusions which may couple with (e.g., by at last partially embedding in) the first side 311 of the flexible member 310. As another nonlimiting example, the housing may include protrusions that are received by recesses on a first side of the flexible member and/or the housing may include recesses that are received by protrusions on a first side of the flexible member. In some implementations, the first side may have a shape (e.g., angle of disposition relative to the first axis 101 of the cover and/or housing) similar to at least a portion of the inner surface of the housing in which the flexible member resides (e.g., as illustrated in FIGS. 1D-G).

The second side 312 of the flexible member may be disposed at a first angle 314 relative to the first axis 101 of the cover and/or housing. The second side or portions there of may be disposed at the first angle. In one implementation, the entire second side may be disposed at the first angle. In some implementations, portions of the second sides may be disposed at the first angle while other portions may not be disposed at the first angle (e.g., sides may be disposed at the first angle and/or corners may be disposed at the first angle). This first angle 314 may be between approximately 20 degrees and approximately 60 degrees (e.g., approximately 45 degrees). In some implementations, the first angle 314 may be between approximately 35 and approximately 50 degrees. Thus, the second side of the flexible member may be disposed at an angle relative to the face of the watch (e.g., a similar angle as the angle with respect to the first axis). Conventionally, in other non-smartwatch applications, such as phones, bumpers are used in covers that are planar with the screen of the phone. However, for smartwatches there is an unexpected result when using the first angle rather than disposing the second side planar with the face/touchscreen of the smartwatch. The force exerted by the flexible member acts to keep the smartwatch case within the cover rather than acting downward on the touchscreen of the smartwatch to push the smartwatch out of the cover. For example, if the strip of the flexible member was disposed parallel to the top surface of the case the force from the deformation of the flexible member attempting to return to its original shape would act downward on the top surface of the case of the smartwatch (e.g., the direction in which the smartwatch would uncouple from the cover). However, utilizing the second side at the first angle causes the forces from the deformation of the flexible member attempting to return to its original shape in a direction that retains the case in the cover, in some implementations.

As illustrated in FIGS. 1A-2H, a first side (e.g., top side of the housing) may not allow the case of the smartwatch to pass through while the second opposing side (e.g., the bottom side) allows the case of the smartwatch to pass through. For example, the opening in the housing may be smaller (e.g., less than the size of the case) proximate the first side than the second side (e.g., which may be larger than the size of the case). If the flexible member pushes downward on the touch screen of the smartwatch, the smartwatch may slowly dislodge, become loose in the cover (e.g., which may cause contact between the housing and the case), and/or become uncoupled from the cover. Thus, by allowing the flexible member to have a second side that is disposed at the first angle relative to the first axis of the housing and/or case, dislodgement and/or uncoupling of the case from the cover may be inhibited.

The flexible member 300 may include one or more legs 330 that extend from the strip 310 away from the opening 305 of the flexible member. A flexible member may include at least one leg on at least on of the sets of opposing sides between a top and a bottom side to maintain the case in a specified position in the cover. As illustrated, in some implementations, the flexible member 300 may include four legs 330. One or more of the legs may be disposed proximate the corners, as illustrated in FIGS. 1B-C. As illustrated in FIGS. 1B-C, the legs 330 may extend up the side walls of the housing but an end of the leg may not, in some implementations extend to the end of the side wall. In some implementations, one or more of the legs may be disposed proximate the corner but not in the corner to avoid stress from repeat insertion of the corner on the leg (e.g., which may be more damaging that contact with sides of a case during insertion of the case in the cover). By disposing an end 331 of the leg (e.g., end opposite the end coupled to the strip of the flexible member) at a distance from the second end (e.g., a housing may have a first end 105 and a second opposing end 107, as illustrated in FIG. 1A), lift (e.g., uncoupling) of the end of the leg may be inhibited.

In various implementations, the legs may extend at a second angle 316 relative to the first axis 101, which is parallel to a top surface of the housing and/or the cover. A leg may extend at the second angle over the length of the leg or a portion of the leg (e.g., portion close to the free end of the leg). For example, the second angle 316 may be approximately 60 to 110 degrees relative to the first axis (e.g., axis approximately parallel to the touchscreen of a smartwatch in the case, the top end of the cover, and/or the top end of the housing). In some implementations, the second angle 316 may be approximately 95 degrees to approximately 85 degrees (e.g., 90 degrees). The extension of the legs may be at a third angle 318 relative to the second side 312 of the strip. In some implementations, the sum of the first angle 314 and the third angle 318 may be approximately 85 to approximately 110 degrees. The first angle and the third angle may be approximately the same in some implementations. These angles may be selected to reduce the forces acting upon the case of the smartwatch to uncouple the smartwatch from the cover.

In some implementations, the flexible member may include recesses 350 and/or openings corresponding to openings in the housing. For example, opening 350, illustrated in FIG. 3G, may at least partially align with opening 230 illustrated in FIGS. 2D-E. In some implementations, the flexible member may not extend to cover and/or partially cover some of the openings in the housing and so the flexible member may not include the same number of recesses as the housing in some implementations, as illustrated in FIG. 1A.

The flexible member may have any appropriately sized overall length 362, width 364, depth 366, and/or thickness 302. The flexible member may be sized based on the smartwatch case the cover is configured to receive. For example, a flexible member for a 40 mm smartwatch may have an overall length 362 of approximately 41 mm to approximately 42 mm (e.g., 41.4 mm). For example, a flexible member for a 40 mm smartwatch may have an overall width 364 of approximately 35 mm to approximately 36 mm (e.g., 35.6 mm). In some implementations, a flexible member for a 40 mm smartwatch may have an overall width 366 of approximately 7 mm to approximately 8 mm (e.g., 7.3 mm). As another nonlimiting example, a flexible member for a 44 mm smartwatch may have an overall length 362 of approximately 45 mm to approximately 46 mm (e.g., 45.4 mm), an overall width 364 of approximately 39 mm to approximately 40 mm (e.g., 39.7 mm), and/or overall depth 366 of approximately 7 mm to approximately 8 mm (e.g., 7.65 mm). A flexible member may have an overall thickness of approximately 0.1 mm to approximately 1 mm. In some implementations, the flexible member may be produced in varying thicknesses (e.g., approximately 0.5 mm, approximately 0.7 mm, approximately 0.9 mm) to accommodate manufacturing tolerances in the housing and/or case of the smartwatch. Since user satisfaction may be increased with a cover that is not loose, the varying models may increase user satisfaction.

In some implementations, the thickness of the flexible member may or may not be uniform. An approximately uniform flexible member may have lower costs and a predetermined level of performance. A variation in the thickness may be utilized to retain an inserted case in the cover and/or facilitate insertion of the case in the cover. For example, an end 311 of the leg may be a thicker than the end proximate the strip to retain a case disposed between the end 311 and the strip. As another nonlimiting example, an end 311 of the leg may be thinner than the end proximate the strip to facilitate insertion of the case in the cover and/or to decrease wear on the end 311.

The cover may be manufactured using any appropriate manufacturing technique. The housing may be cast, molded, laser cut, etc. In various implementations, the flexible member may or may be a unibody flexible member. The flexible member may be injection molded, printed, and/or formed by any appropriate manner. The flexible member may include any appropriate material. The flexible member may include material that is elastically deformable. In some implementations, the flexible member may be silicone.

In some implementations, the flexible member or portions there of may or may not be symmetrical.

In some implementations, the flexible member may be manufactured such that the angles of the second side of the strip and the legs (e.g., first and/or second angles) is specified (e.g., as opposed to a flat manufacturing process). Manufacturing these angles may reduce fatigue of the flexible member and/or increase user satisfaction (e.g., the inner surface may be more aesthetically pleasing since wrinkles and/or fatigue lines may not be visible from the inner side of the cover).

In some implementations, a housing may be able to accommodate more than one size of smartwatch by utilizing a different flexible member with the housing. For example, a first flexible member may be coupled to an inner surface of a first housing and the resulting cover may receive a first smart watch; and, a second flexible member may be coupled to the inner surface of the first housing and the resulting cover may receive a second smart watch that is different in size and/or shape.

In various implementations, a smartwatch cover may include a housing and a flexible member (e.g., a gasket) coupled to the housing. The housing may be metal in some implementations. Metal and/or partially metal housings may increase user satisfaction due to the sturdiness of a metal cover, the aesthetic capabilities of metal housing (e.g., stone settings, easily hold a variety of shapes, variety of finishes available such as polished and/or matte, etc.). A simple smartwatch may be elevated to jewelry with the cover due to the beauty of the cover, the customization of the look of a smartwatch based on the cover, and/or the ability to coordinate the cover and thus the smartwatch with outfits and/or other accessories a user is wearing. The housing may include an opening (e.g., a central opening) through the housing, such that side walls surround the opening. A first end of the opening (e.g., proximate a touchscreen of a smartwatch) may be smaller than the second end of the opening. The opening may allow access to top portions of the smartwatch (e.g., touchscreen, face, etc.). The housing may include an inner surface and an opposing outer surface. The inner surface may or may not include retaining members to increase the coupling between and/or inhibit the uncoupling of the flexible member and the housing. A first axis may be parallel to a top surface of a case coupled to the housing, the top side of the cover, and/or the top side of the housing. The cover may include a flexible member coupled to at least a part of the inner surface of the housing. The flexible member may include an opening and a strip at least partially circumscribing the perimeter of the opening and/or the perimeter of the top portion of the inner surface of the housing. The flexible member may not be visible through the opening of the housing when a case is coupled to the cover. The strip may be an annular member and/or segments (e.g., with and/or without gap(s) separating ends of the segments). The strip includes a first side coupled to an inner surface of the housing and a second opposing side. The second opposing side may be to contact a portion of a case of a smartwatch proximate the top surface of the smartwatch when the smartwatch is disposed in the cover. The second side of the annular strip may be disposed at a first angle relative to the first axis (e.g., approximately 20 and approximately 60 degrees relative to the first plane). The flexible member may include two or more legs extending away from the opening of the annular strip. The legs may extend from the annular strip at a second angle relative to the first plane of the housing (e.g., approximately 60 degrees and approximately 110 degrees). The flexible may inhibit contact of the smartwatch case with the housing and/or may inhibit substantial degradation of signal transmission from the smartwatch when it is disposed in the cover (e.g., due to contact with metal surfaces of the housing which may interfere with wireless transmission and receipt of signals, such as Bluetooth, WiFi, cellular data, etc.).

In some implementations, a smartwatch may be coupled to a case by inserting the case of the smartwatch into an end of the cover and/or housing, where an opposing end of the cover and/or housing is configured to be proximate a touchscreen of a coupled smartwatch. The insertion of the case may elastically deform at least a portion of the flexible member coupled to an inner surface of the housing of the cover. An end of the arm (e.g., free end) of the flexible member may extend along the side wall of the housing beyond the case of the inserted smartwatch. The arm(s) and/or strip of the flexible member may exert a force on the case of the smartwatch to inhibit inadvertent release of the smartwatch from the cover. The bands of the smartwatch may be inserted through openings in the housing prior to inserting the case into the housing. In some implementations, one or more bands of the smartwatch may be uncoupled from the smartwatch, the case may be inserted into the housing of the cover, and then the one or more uncoupled bands may be recoupled to the case via openings in the housing. In some implementations, the housing may include coupling members (e.g., lugs, loops, etc.) to couple with the bands or other bands.

In some implementations, the cover may include a member that resides above a touchscreen and/or face of the smartwatch. For example, the member may be a film (e.g., adhesive and/or nonadhesive), a thin plastic sheet, and/or any other appropriate material. The member may not inhibit receipt of input (e.g., touch, pressure, etc.) via a touchscreen of the smartwatch.

In various implementations, a smartwatch case may be configured to receive a set of smartwatches. The set of smartwatches may have similar sizes, shapes, and/or buttons.

In various implementations, any appropriate coupling method may be used to couple the flexible member and the housing, such as adhesives, bonding agents, thermal bonding, etc. The coupling may resist separation between the flexible member and the housing during normal use (e.g., repeat insertion and removal of the case of the smartwatch from the cover).

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a leg" includes a combination of two or more legs and reference to "a protrusion" includes different types and/or combinations of protrusions. As another example, a strip of a flexible member may refer to more than two or more strips of a flexible member.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A smartwatch cover comprising:
   a housing configured to receive at least a portion of a case of a smartwatch,
   wherein the housing comprises:
      an inner surface; and
      an opposing outer surface;
      an opening through which a top surface of a smartwatch is accessible;
      a first plane, wherein the first plane is parallel to the top surface of the smartwatch when the smartwatch is disposed in the housing;
   a flexible member coupled to at least a part of the inner surface of the housing, wherein the flexible member comprises:
      an annular strip with an opening disposed through the annular strip, wherein the annular strip comprises:
         a first side coupled to the inner surface of the housing;
         a second opposing side, wherein the second side of the annular strip is configured to contact a portion of the case of the smartwatch proximate the top surface of the smartwatch when the smartwatch is disposed in the smartwatch cover, and wherein at least a portion of the second side of the annular strip is disposed at a first angle relative to the first plane of the housing, wherein the first angle is approximately 20 to approximately 60 degrees relative to the first plane;
      at least four legs extending away from the opening of the annular strip in a direction from a first end to a second end of the housing, and wherein the at least four legs extend from the annular strip at a second angle relative to the first plane of the housing, wherein the second angle is approximately 60 degrees to approximately 110 degrees;
   and wherein the flexible member inhibits contact of the case of the smartwatch with the housing, and wherein the flexible member inhibits substantial degradation of signal transmission from the smartwatch when the case of the smartwatch is disposed at least partially in the cover.

2. The smartwatch cover of claim 1 wherein the annular strip has an approximately rectangular or an approximately oval shape.

3. The smartwatch cover of claim 1 wherein a shape of the opening of the housing and a shape of the opening of the flexible member are similar.

4. The smartwatch cover of claim 1 wherein at least one of a shape of the opening of the housing or a shape of the opening of the flexible member is approximately rectangular.

5. The smartwatch cover of claim 1 wherein at least one of a shape of the opening of the housing or a shape of the opening of the flexible member is approximately oval.

6. The smartwatch cover of claim 1 wherein the second angle is approximately 80 degrees to approximately 100 degrees.

7. The smartwatch cover of claim 1 wherein the inner surface of the housing comprises a retaining member, and wherein the retaining comprises at least one of one or more recesses or one or more protrusions, wherein the retaining member is configured to strengthen the coupling between the flexible member and the housing.

8. The smartwatch cover of claim 1 wherein the housing comprises a first end proximate the annular strip of the flexible member and a second opposing end; and wherein each of the legs does not extend to the second opposing end of the housing.

9. The smartwatch cover of claim 1 wherein the flexible member comprises a first width and one or more narrowing portions with a second width, wherein the second width is less than the first width, and wherein the one or more narrowing portions allow access to portions of a smartwatch disposed in the smartwatch cover.

10. The smartwatch cover of claim 1 wherein the at least four legs are disposed at approximately 80 degrees to approximately 100 degrees relative to the first plane of the housing.

11. A flexible member for a smartwatch cover comprising:
a first plane approximately parallel with a top surface of a smartwatch disposed in a smartwatch cover;
the flexible member couplable to at least a part of an inner surface of a housing of the smartwatch cover, wherein the flexible member comprises:
an annular strip with an opening disposed through the annular strip,
wherein the annular strip comprises:
a first side coupled to the inner surface of the housing;
a second opposing side, wherein the second side of the annular strip is configured to contact a portion of a case of the smartwatch proximate the top surface of the smartwatch when the smartwatch is disposed in the cover, and wherein at least a portion of the second side of the annular strip is disposed at a first angle relative to the first plane, wherein the first angle is approximately 20 to approximately 60 degrees relative to the first plane; and
at least four legs extending away from the opening of the annular strip in a direction from a first end to a second end of the housing, and wherein the at least four legs extend from the annular strip at a second angle relative to the first plane, wherein the second angle is between approximately 60 degrees and approximately 110 degrees;
and wherein the flexible member inhibits contact of the case of the smartwatch with the housing when the case is disposed in the smartwatch cover, and wherein the flexible member inhibits substantial degradation of signal transmission from the smartwatch when the case of the smartwatch is disposed at least partially in the cover.

12. The gasket of claim 11 wherein the flexible member comprises a unibody flexible member.

13. The smartwatch cover of claim 11 wherein the flexible member comprises an approximately uniform thickness.

14. The smartwatch cover of claim 11 wherein one or more of the legs of the flexible member include a tapered section.

15. The smartwatch cover of claim 11 wherein each of the at least four legs are similar in shape and size.

16. The smartwatch cover of claim 11 wherein the at least four legs are disposed at approximately 80 degrees to approximately 100 degrees relative to the first plane.

17. A smartwatch cover comprising:
a housing configured to receive at least a portion of a case of a smartwatch, wherein the housing comprises:
an inner surface; and
an opposing outer surface;
an opening through which a top surface of a smartwatch is accessible;
a first plane, wherein the first plane is parallel to the top surface of the case of the smartwatch when the case of the smartwatch is disposed in the housing;
a flexible member coupled to at least a part of the inner surface of the housing, wherein the flexible member comprises:
a first opening;
a strip at least partially circumscribing a perimeter of a top portion of the inner surface of the housing and at least a portion of the first opening, wherein the annular strip comprises:
a first side coupled to the inner surface of the housing;
a second opposing side, wherein the second side of the strip is configured to contact a portion of the case of the smartwatch proximate the top surface of the smartwatch when the case of the smartwatch is disposed at least partially in the cover, and wherein at least a portion of the second side of the strip is disposed at a first angle relative to the first plane of the housing, wherein the first angle is approximately 20 to approximately 60 degrees relative to the first plane;
at least two legs extending away from the opening of the strip of the flexible member strip in a direction from a first end to a second end of the housing, and wherein the at least two legs extend from the strip at a second angle relative to the first plane of the housing, wherein the second angle is approximately 60 degrees to approximately 110 degrees;
and wherein the flexible member inhibits contact of the case of the smartwatch with the housing, and wherein the flexible member inhibits substantial degradation of signal transmission from the smartwatch when the case of the smartwatch is disposed at least partially in the cover.

18. The smartwatch cover of claim 17 wherein the strip comprises two or more segments.

19. The smartwatch cover of claim 17 wherein ends of two or more of the segments of the strip are separated by one or more gaps.

20. The gasket of claim 17 wherein the flexible member comprises a unibody flexible member.

* * * * *